(12) United States Patent
Sano et al.

(10) Patent No.: US 9,357,191 B2
(45) Date of Patent: May 31, 2016

(54) IMAGE PROCESSOR, IMAGE PROCESSING METHOD, AND IMAGE PROJECTOR

(71) Applicant: KABUSHIKI KAISHA TOSHIBA, Minato-ku, Tokyo (JP)

(72) Inventors: Yuma Sano, Kawasaki Kanagawa (JP); Ryosuke Nonaka, Yokohama Kanagawa (JP); Masahiro Baba, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/565,869

(22) Filed: Dec. 10, 2014

(65) Prior Publication Data

US 2015/0195479 A1     Jul. 9, 2015

(30) Foreign Application Priority Data

Jan. 6, 2014 (JP) ................................. 2014-000310

(51) Int. Cl.
    *G03B 21/14*         (2006.01)
    *H04N 9/31*          (2006.01)

(52) U.S. Cl.
    CPC ............ *H04N 9/3194* (2013.01); *G03B 21/147* (2013.01); *H04N 9/3185* (2013.01)

(58) Field of Classification Search
    CPC ........ G03B 21/14; G03B 21/147; H04N 9/31; H04N 9/3185; H04N 9/3194; H04N 9/3188
    USPC .................................. 353/69, 70, 79, 121, 122
    See application file for complete search history.

(56) References Cited

U.S. PATENT DOCUMENTS

| | | | | |
|---|---|---|---|---|
| 7,055,958 | B2 * | 6/2006 | Tajima | ...................... G06T 3/00 348/E5.137 |
| 8,268,094 | B2 * | 9/2012 | Zurecki | .................... H05H 1/48 148/217 |
| 2013/0194554 | A1 | 8/2013 | Aruga | |
| 2016/0014385 | A1 * | 1/2016 | Sano | .................... H04N 9/3188 348/571 |

FOREIGN PATENT DOCUMENTS

| | | |
|---|---|---|
| JP | 2013-064827 | 4/2013 |
| JP | 2013-156324 | 8/2013 |

* cited by examiner

*Primary Examiner* — William C Dowling
(74) *Attorney, Agent, or Firm* — Nixon & Vanderhye, P.C.

(57) ABSTRACT

According to one embodiment, an image processor includes: an acquisitor; a predictor; a corrector. The acquisitor acquires information regarding shape of a projection surface on which a first image is projected, information regarding position of a viewpoint for observing the first image projected on the projection surface, and information regarding position of a projection point for projecting the first image. The predictor predicts a viewable region in which the first image projected on the projection surface is viewable from the viewpoint based on the acquired information regarding the shape, the acquired information regarding the viewpoint, and the acquired information regarding the projection point. The corrector corrects a second image to generate the first image, the second image being set within the viewable region.

19 Claims, 12 Drawing Sheets

IMAGE PROCESSOR, IMAGE PROCESSING METHOD, AND IMAGE PROJECTOR

CROSS-REFERENCE TO RELATED APPLICATIONS

This application is based upon and claims the benefit of priority from Japanese Patent Application No. 2014-000310, filed on Jan. 6, 2014; the entire contents of which are incorporated herein by reference.

FIELD

Embodiments described herein relate generally to an image processor, an image processing method, and an image projector.

BACKGROUND

In the case where an image projector such as a projector projects an image, there may be an obstacle between the surface on which the image is projected (projection surface) and the image projector. Then, at least a partial region of the image projected from the image projector is blocked by the obstacle. Accordingly, the image in the region blocked by the obstacle is lost on the projection surface.

Even in the case where the image projected from the image projector is not blocked by the obstacle, at least a partial region of the image projected from the image projector may be hidden behind the obstacle depending on the position of the viewpoint of a person who views the image projected on the projection surface. Then, for the person who views the image from the position of that viewpoint, at least part of the image in the region hidden behind the obstacle is lost.

There is demand for an image processor, an image processing method, and an image projector capable of displaying the inputted image without loss.

DETAILED DESCRIPTION

Figure 1:
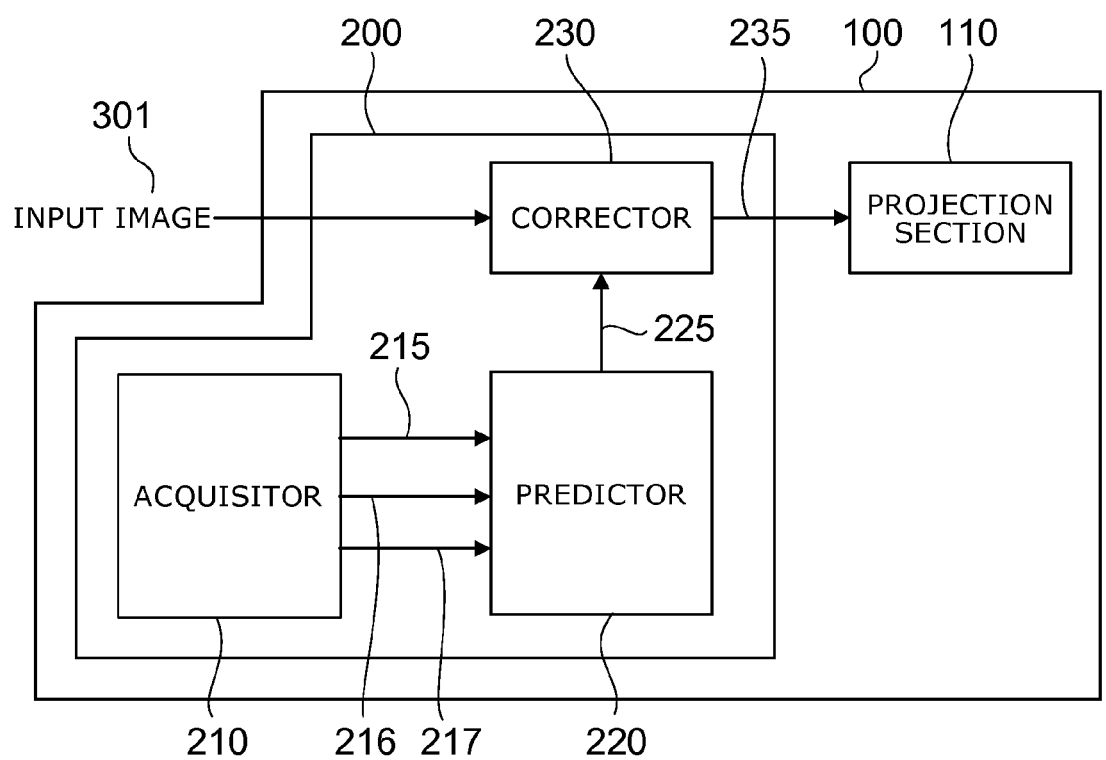
FIG. 1 is a block diagram showing an image processor and an image projector according to an embodiment of the invention.

In general, according to one embodiment, an image processor includes: an acquisitor; a predictor; a corrector. The acquisitor acquires information regarding shape of a projection surface on which a first image is projected, information regarding position of a viewpoint for observing the first image projected on the projection surface, and information regarding position of a projection point for projecting the first image. The predictor predicts a viewable region in which the first image projected on the projection surface is viewable from the viewpoint based on the acquired information regarding the shape, the acquired information regarding the viewpoint, and the acquired information regarding the projection point. The correction section corrects a second image to generate the first image, the second image being set within the viewable region.

Embodiments of the invention will now be described with reference to the drawings. In the drawings, similar components are labeled with like reference numerals, and the detailed description thereof is omitted appropriately.

FIG. 1 is a block diagram showing an image processor and an image projector according to an embodiment of the invention.

Figure 2:
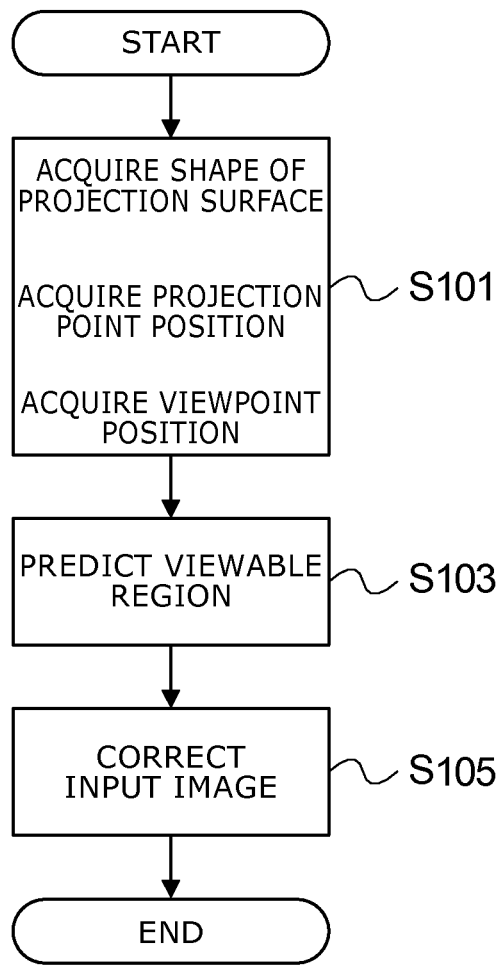
FIG. 2 is a flow chart describing an image processing method according to this embodiment.

FIG. 2 is a flow chart describing an image processing method according to this embodiment.

The block diagram shown in FIG. 1 is an example of the main configuration of the image processor according to this embodiment, and is not necessarily in agreement with the configuration of actual program modules. This also applies to the main configuration of the image processor 200a shown in FIGS. 3 and 14.

The image projector 100 shown in FIG. 1 includes an image processor 200 and a projection section 110.

The image processor 200 includes an acquisitor 210, a predictor 220, and a corrector 230.

The image processor 200 may be an external device different from the image projector 100, or may be a device included in the image projector 100. The hardware configuration shown in FIG. 1 is only illustrative. Part or all of the image processor 200 according to the embodiments and the specific examples may be realized as an integrated circuit such as LSI (large scale integration) or an IC (integrated circuit) chip set. The functional blocks may be individually configured as processors. Alternatively, some or all of the functional blocks may be integrated into a processor. The integrated circuit is not limited to LSI, but may be configured as a dedicated circuit or in a general-purpose processor. These also apply to the image processor 200a and the image projector 100a shown in FIGS. 3 and 14.

The acquisitor 210 acquires shape information 215, projection point information 216, and viewpoint information 217. The shape information 215 is information regarding the three-dimensional shape of the surface (projection surface) 351 on which an image (first image) is projected (see FIG. 6C). The projection point information 216 is information regarding the position of the point (projection point) from which the image (first image) is projected. The viewpoint information 217 is information regarding the position of the viewpoint of a person who views the image (first image) projected on the projection surface 351. The acquisitor 210 sends the shape information 215, the projection point information 216, and the viewpoint information 217 to the predictor 220.

The projection point is included in the projection section 110. For example, the projection point is a center of a projection lens of the projection section 110. For example, the projection point is one point on a surface of the projection section 110. The one point is included in a part of outputting a projection image. For example, the one point is a center in the part of outputting the projection image.

The predictor 220 predicts a viewable region based on the shape information 215, the projection point information 216, and the viewpoint information 217 sent from the acquisitor 210. The viewable region is a region of the image projected on the projection surface 351, and is viewable as viewed from the viewpoint of the viewpoint information 217 acquired by the acquisitor 210. In other words, the predictor 220 predicts how the image projected on the projection surface 351 is viewed from the viewpoint if an input image (object image: second image) 301 is directly projected. For instance, the predictor 220 predicts how the input image 301 is lost by an obstacle existing between the projection surface 351 and the image projector 100. Alternatively, the predictor 220 predicts how the input image 301 is distorted by the warpage of the projection surface 351. In the case where there are a plurality of viewpoints, the predictor 220 predicts a viewable region for each viewpoint. The predictor 220 sends information (region information) 225 regarding the viewable region to the corrector 230.

The corrector 230 corrects the input image 301 based on the region information 225 sent from the predictor 220. For instance, the corrector 230 compares the input image 301 with the prediction image (region information) 225 for each pixel of the input image 301. Thus, the corrector 230 corrects the input image 301 by determining viewable pixels of the input image 301 and unviewable pixels of the input image 301. The corrector 230 sends the image (correction image) 235 obtained by correcting the input image 301 to the projection section 110.

The projection section 110 projects the correction image 235 sent from the corrector 230 on the projection surface 351.

As shown in FIG. 2, the image processor 200 uses the acquisitor 210 to acquire the shape information 215 of the projection surface 351, the projection point information 216, and the viewpoint information 217 (step S101). Next, the image processor 200 uses the predictor 220 to predict a viewable region of the image projected on the projection surface 351 as viewed from the viewpoint of the viewpoint information 217. Next, the image processor 200 uses the corrector 230 to correct the input image 301 based on the region information 225.

According to this embodiment, the image processor 200 can predict an unviewable region based on the shape information 215, the projection point information 216, and the viewpoint information 217. The unviewable region is a region of the image projected on the projection surface 351, and is unviewable as viewed from the viewpoint of the viewpoint information 217. In the region of the image projected from the image projector 100, the unviewable region is e.g. a region hidden behind an obstacle as viewed from the viewpoint of the viewpoint information 217. Alternatively, the unviewable region is e.g. a region having a relatively poor viewability due to the material of the projection surface 351. The image processor 200 corrects the input image 301 so that the input image 301 is not projected on the unviewable region. In other words, the image processor 200 corrects the input image 301 so that the input image 301 is set within the viewable region. The image projector 100 uses the projection section 110 to project the correction image 235 on the projection surface 351. The correction image 235 is an image obtained by correcting the input image 301 by the image processor 200. Thus, the image projector 100 can display the input image 301 on the projection surface 351 without loss even in the case where there is a region hidden behind an obstacle on the projection surface 351 as viewed from an arbitrary viewpoint different from the image projector 100.

In the following, specific examples of the image projector, the image processor, and the image processing method are described with reference to the drawings.

Figure 3:
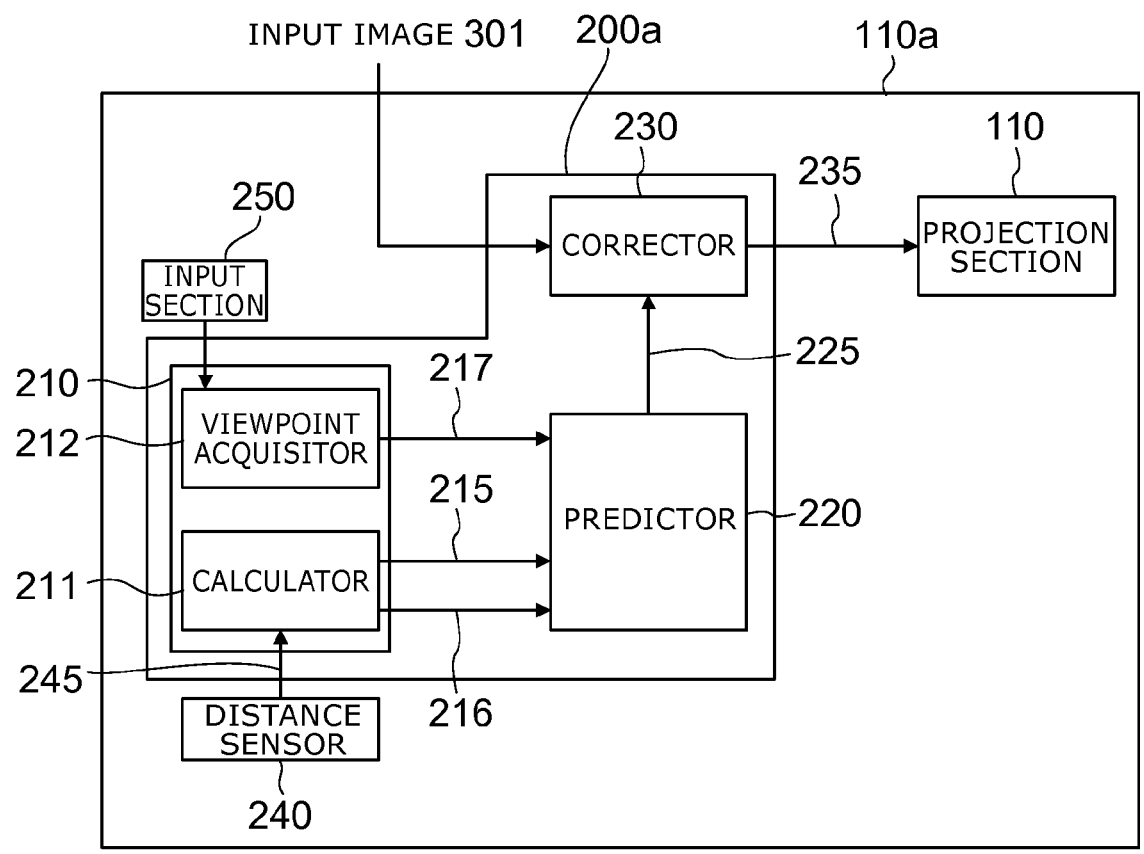
FIG. 3 is a block diagram showing a specific example of the image processor and the image projector according to this embodiment.

FIG. 3 is a block diagram showing a specific example of the image processor and the image projector according to this embodiment.

Figure 4:
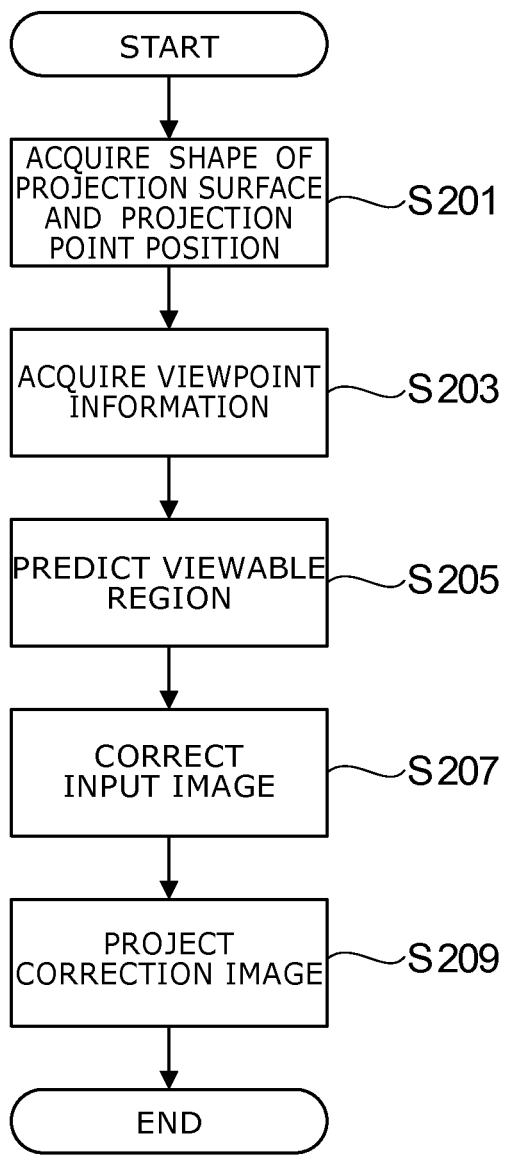
FIG. 4 is a flow chart describing a specific example of the image processing method according to this embodiment.

FIG. 4 is a flow chart describing a specific example of the image processing method according to this embodiment.

The image projector 100a shown in FIG. 3 includes an image processor 200a, a projection section 110, and a distance sensor 240.

The image processor 200a includes an acquisitor 210, a predictor 220, and a corrector 230. The acquisitor 210 includes a calculator 211 and a viewpoint acquisitor 212.

The distance sensor 240 measures the distance from the distance sensor 240 to the projection surface 351. The distance sensor 240 sends information (distance information) 245 regarding the measured distance to the calculator 211.

The calculator 211 calculates the shape of the projection surface 351 and the position of the projection point using the distance measured by the distance sensor 240. In other words, the calculator 211 acquires the shape information 215 of the projection surface 351 and the projection point information 216. The calculator 211 sends the shape information 215 and the projection point information 216 to the predictor 220.

The viewpoint acquisitor 212 acquires viewpoint information 217. The viewpoint acquisitor 212 sends the acquired viewpoint information 217 to the predictor.

The rest of the main configuration is similar to the main configuration described above with reference to FIG. 1.

The details of the image processor 200a and the image processing method of this specific example are further described.

Figure 5:
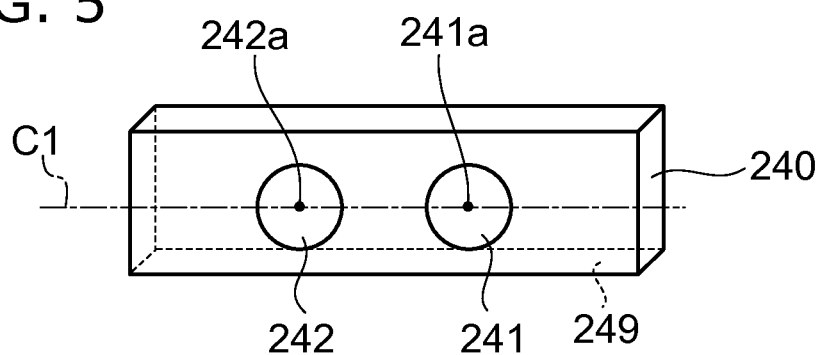
FIG. 5 is a schematic perspective view showing an example of the distance sensor of this embodiment.

FIG. 5 is a schematic perspective view showing an example of the distance sensor of this embodiment.

Figure 6A:
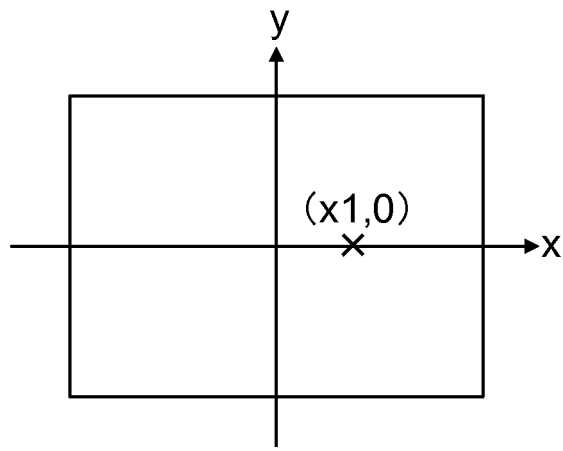
FIGS. 6A to 6C are schematic plan views describing a method for calculating three-dimensional coordinates of the projection surface.
Figure 6B:
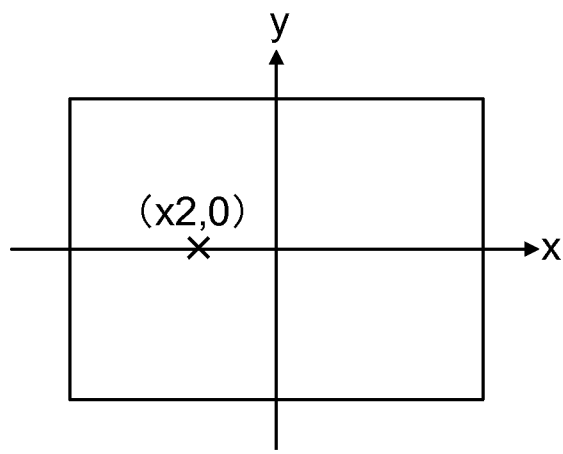
Figure 6C:
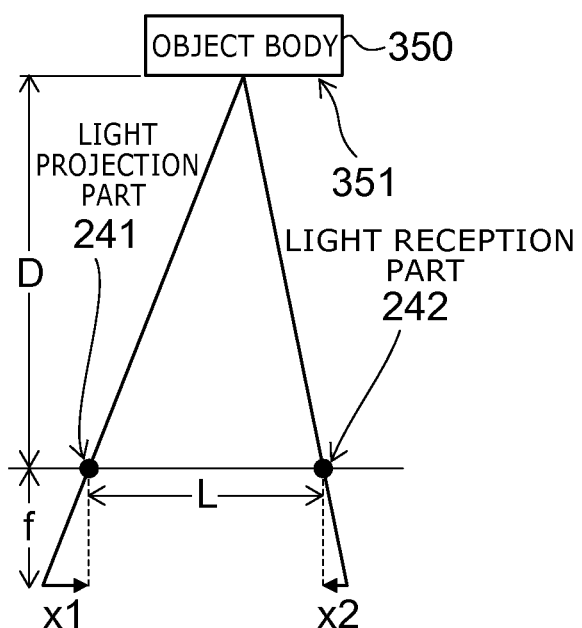

FIGS. 6A to 6C are schematic plan views describing a method for calculating three-dimensional coordinates of the projection surface.

FIG. 6A is a schematic plan view illustrating the coordinates of a pixel of the light projection image. FIG. 6B is a schematic plan view illustrating the coordinates of a pixel of the light reception image. FIG. 6C is a schematic plan view illustrating the geometric relation among the light projection part, the light reception part, and the object body. The object body 350 forms a projection surface 351.

The calculator 211 acquires shape information 215 and projection point information 216 using the distance measured by the distance sensor 240 (the distance from the distance sensor 240 to the projection surface 351). The shape information 215 is information regarding the three-dimensional shape of the projection surface 351. The projection point information 216 is information regarding the position of the projection point. The calculator 211 sends the shape information 215 and the projection point information 216 to the predictor 220 (step S201).

Here, the distance sensor 240 shown in FIG. 5 includes a light projection part 241 and a light reception part 242. The light projection part 241 and the light reception part 242 are provided at a generally equal height. The center line C1 connecting the center 241*a* of the light projection part 241 and the center 242*a* of the light reception part 242 is generally parallel to the bottom surface 249 of the distance sensor 240. Thus, when the distance sensor 240 is placed on a horizontal plane, the center line C1 is made horizontal.

The light projection part 241 projects infrared light having a random pattern on the projection surface 351. The light reception part 242 receives the infrared light projected by the light projection part 241 and reflected from the projection surface 351. Here, the pattern of the infrared light projected by the distance sensor 240 and the infrared light received by the distance sensor 240 is considered as a two-dimensional image. The coordinates of a pixel of the light projection image is denoted by ($x_p$, $y_p$). The coordinates of a pixel of the light reception image corresponding to the coordinates ($x_p$, $y_p$) are denoted by ($x_c$, $y_c$). The calculator 211 determines the coordinates ($x_c$, $y_c$) of the pixel of the light reception image corresponding to the coordinates ($x_p$, $y_p$) of the pixel of the light projection image. Thus, the calculator 211 can determine the three-dimensional coordinates ($X_s$, $Y_s$, $Z_s$) of the projection surface 351. Here, the light reception part 242 is assumed to be placed at the origin of the three-dimensional coordinates.

The method for calculating the three-dimensional coordinates ($X_s$, $Y_s$, $Z_s$) of the projection surface is further described with reference to FIGS. 6A to 6C.

As shown in FIG. 6A, the calculation method is considered in the case where the coordinates of the pixel of the light reception image corresponding to the coordinates (x1, 0) of the pixel of the light projection image is (x2, 0). The relation among the light projection part 241, the light reception part 242, and the object body 350 irradiated with the light of the pixel at the coordinates (x1, 0) of the light projection image is as shown in FIG. 6C.

The symbol "L" shown in FIG. 6C represents the physical distance between the light projection part 241 and the light reception part 242. The symbol "D" shown in FIG. 6C represents the distance between the distance sensor 240 and the object body 350. The symbol "f" shown in FIG. 6C represents the focal distance of the light reception part 242. Here, the relation of Equation (1) holds from the geometric relation.

[Math 1]

$$\frac{D}{L} = \frac{f}{(x1 - x2)} \quad \text{Equation (1)}$$

The distance between the distance sensor 240 and the object body 350 is given by Equation (2) from Equation (1).

[Math 2]

$$D = \frac{fL}{(x1 - x2)} \quad \text{Equation (2)}$$

Thus, the three-dimensional coordinates ($X_s$, $Y_s$, $Z_s$) of the point of the object body 350 irradiated with the light of the pixel at the coordinates (x1, 0) of the light projection image are given by Equations (3)-(5).

[Math 3]

$$X_s = \frac{x_c}{f} D = \frac{x2}{f} D \quad \text{Equation (3)}$$

$$Y_s = \frac{y_c}{f} D = 0 \quad \text{Equation (4)}$$

$$Z_s = D = \frac{fL}{(x1 - x2)} \quad \text{Equation (5)}$$

This specific example is described with reference to the distance sensor 240. The distance sensor 240 integrally includes a light projection part 241 and a light reception part 242. The light projection part 241 projects infrared light having a specific pattern. The light reception part 242 receives infrared light. Here, the light projected by the light projection part 241 and received by the light reception part 242 may be visible light.

As an alternative example of the means for measuring the distance, the image projector 100*a* may include a capture section, not shown, instead of the distance sensor 240. In this case, the projection section 110 projects light of a specific pattern on the object body 350. The capture section captures the object body 350. The image projector 100*a* determines the distance between the capture section and the object body 350 from the correspondence between the image captured by the capture section and the original pattern projected on the object body 350 by the projection section 110.

Alternatively, the image projector 100*a* may include a plurality of capture sections, not shown, instead of the distance sensor 240. In this case, the image projector 100*a* determines the distance between the capture sections and the object body 350 from the correspondence between the pixels of a plurality of images captured by the plurality of capture sections. For instance, the image projector 100*a* determines the distance between the line connecting two capture sections and the object body 350. Thus, the distance sensor 240 is an example of the means for acquiring the three-dimensional shape of the object body 350 on which a picture is projected from the projection section 110. The means for acquiring the three-dimensional shape of the object body 350 is not limited to the foregoing.

The coordinates of the three-dimensional shape of the object body 350 are calculated with the light reception part 242 of the distance sensor 240 placed at the origin. Thus, the coordinates of the projection point (projection section 110) can be specified using the distance between the light reception part 242 of the distance sensor 240 and the projection section 110. For instance, the projection section 110 and the light reception part 242 may be separated from each other by px in the x-direction, py in the y-direction, and pz in the z-direction. In this case, the coordinates of the projection point can be specified as ($X_p$, $Y_p$, $Z_p$)=(px, py, pz). The calculator 211 calculates the three-dimensional shape of the projection surface 351. The calculator 211 sends the shape information 215 of the projection surface 351 and the information (projection point information) 216 regarding the position of the projection point to the predictor 220.

Next, the viewpoint acquisitor 212 acquires viewpoint information 217 (step S203). In this specific example, the viewpoint acquisitor 212 includes a look-up table (LUT) recording positions of prescribed viewpoints. The viewpoint acquisitor 212 acquires information regarding the position of the viewpoint by reading the LUT. The LUT previously records the coordinates of viewpoints with the capture section of the distance sensor 240 placed at the origin. The viewpoint acquisitor 212 acquires as viewpoint information 217 the coordinates ($X_c$, $Y_c$, $Z_c$) recorded in the LUT.

As an alternative means for acquiring viewpoint information 217, the image projector 100a may include an input section 250 in which a user can input the viewpoint position. In this case, the user inputs information regarding the position of the viewpoint by the input section 250. Thus, the viewpoint acquisitor 212 can acquire viewpoint information 217.

Figure 7:
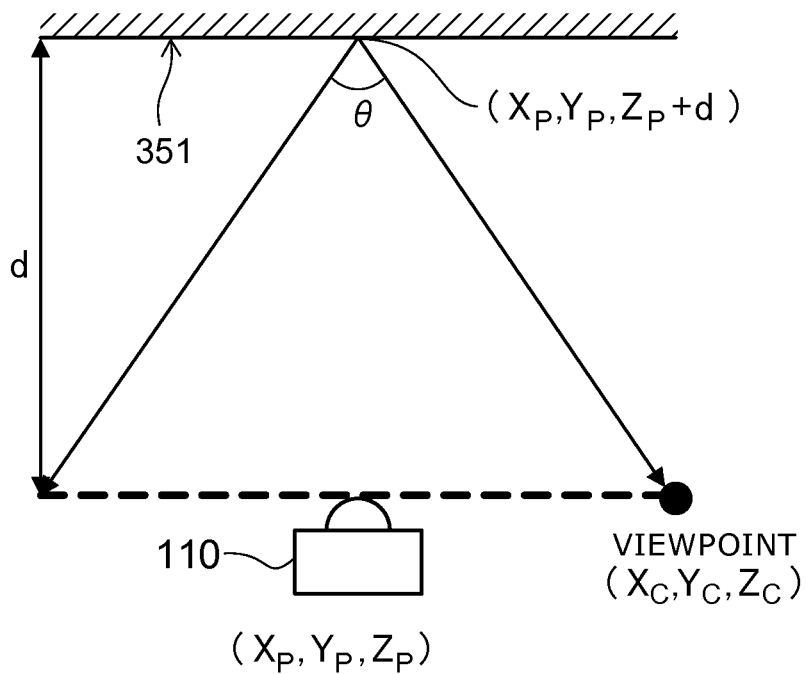
FIG. 7 is a schematic plan view illustrating an alternative means for acquiring viewpoint information.

FIG. 7 is a schematic plan view illustrating an alternative means for acquiring viewpoint information.

As an alternative means for acquiring viewpoint information 217, the viewpoint acquisitor 212 may acquire information regarding the position of the viewpoint based on the distance between the projection section 110 and the projection surface 351 calculated by the calculator 211. Specifically, first, as shown in FIG. 7, a view angle θ is prespecified. The coordinates ($X_c$, $Y_c$, $Z_c$) of the position of the viewpoint can be specified depending on the values of the view angle θ and the distance d between the projection section 110 and the projection surface 351. The coordinates ($X_c$, $Y_c$, $Z_c$) of the position of the viewpoint are given by Equations (6)-(8). Here, ($X_p$, $Y_p$, $Z_p$) represents the three-dimensional coordinates of the projection section 110. The symbol $θ_x$ represents the horizontal view angle. The symbol $θ_y$ represents the vertical view angle.

[Math 4]

$$X_C = X_P \pm \frac{d}{\tan\frac{θ_x}{2}} \quad \text{Equation (6)}$$

$$Y_C = Y_P \pm \frac{d}{\tan\frac{θ_y}{2}} \quad \text{Equation (7)}$$

$$Z_C = Z_P \quad \text{Equation (8)}$$

The viewpoint acquisitor 212 sends the acquired viewpoint information 217 to the predictor 220.

Next, the predictor 220 predicts a viewable region not constituting a blind spot as viewed from the acquired viewpoint position ($X_c$, $Y_c$, $Z_c$) (step S205). This is based on the three-dimensional coordinates ($X_s$, $Y_s$, $Z_s$) of the projection surface 351, the coordinates ($X_p$, $Y_p$, $Z_p$) of the position of the projection point, and the coordinates ($X_c$, $Y_c$, $Z_c$) of the position of the viewpoint.

In this specification, the "blind spot" refers to the region, range, or site on the projection surface 351 that cannot be viewed from an arbitrary viewpoint position.

In this specification, the coordinates ($X_c$, $Y_c$, $Z_c$) of the position of the viewpoint may be referred to as viewpoint position ($X_c$, $Y_c$, $Z_c$).

First, the predictor 220 predicts an image observed when the image projected from the projection section 110 on the projection surface 351 is viewed from the viewpoint position ($X_c$, $Y_c$, $Z_c$). Specifically, the predictor 220 virtually maps a texture image from the projection section 110 on the projection surface 351 using the projective texture mapping technique. The predictor 220 calculates an observation image $m_e$ of the projection surface 351 pasted with the texture image as viewed from the viewpoint position ($X_c$, $Y_c$, $Z_c$). The three-dimensional coordinates of the projection surface 351 are expressed as M=($X_s$, $Y_s$, $Z_s$). Then, the coordinates t=(u,v) of the texture image pasted on the projection surface M are given by Equation (9).

[Math 5]

$$\tilde{t} = N \cdot P_p \cdot \tilde{M} \quad \text{Equation (9)}$$

$\tilde{t}$ represents the homogeneous coordinates of the observation image $m_e$.

$\tilde{M}$ represents the homogeneous coordinates of the projection surface M.

The symbol "$P_p$" expressed in Equation (9) represents a perspective projection matrix of the projection surface 351 as viewed from the projection section 110. The symbol "N" expressed in Equation (9) represents a matrix for normalizing the image coordinates (x,y) with the origin placed at the center of the image and the image coordinates (u,v) with the origin placed at the upper left end of the image. The predictor 220 calculates an observation image $m_e$ of the projection surface M pasted with the texture image as viewed from the viewpoint position ($X_c$, $Y_c$, $Z_c$). This is based on the texture coordinates t=(u,v) determined by Equation (9).

[Math 6]

$$\tilde{m}_e \cong P_c \tilde{M} \quad \text{Equation (10)}$$

The symbol "$P_c$" expressed in Equation (10) represents a perspective projection matrix of the projection surface 351 as viewed from the viewpoint position ($X_c$, $Y_c$, $Z_c$). In reality, the light reception part 242 is located at the position of the distance sensor 240 attached to the projection section 110. On the other hand, calculation of the observation image $m_e$ enables prediction of how the image is viewed from the virtually specified position.

Here, the image obtained by converting the texture image from the uv-coordinates to the xy-coordinates is denoted by "$m_o$". Comparing the texture image $m_o$ with the observation image $m_e$, there is a region existing in the texture image $m_o$ and not existing in the observation image $m_e$. When a region of light projected from the projection section 110 on the projection surface 351 is a blind spot as viewed from the viewpoint position ($X_c$, $Y_c$, $Z_c$), this region does not exist on the observation image $m_e$.

That is, the region existing in the texture image $m_o$ and not existing in the observation image $m_e$ is located at a blind spot as viewed from the viewpoint position ($X_c$, $Y_c$, $Z_c$). This region is an unviewable region. Thus, the predictor 220 determines the observation image $m_e$, and searches for a corresponding region of the texture image $m_o$ and observation image $m_e$. Accordingly, the predictor 220 can determine which region is viewable and which region is unviewable in the region of the image projected from the projection section 110 when the projection surface 351 is viewed from an arbitrary viewpoint. Alternatively, the predictor 220 may search all the pixels of the texture image $m_o$ to see whether there is any corresponding pixel in the observation image $m_e$. Thus, for each pixel, the predictor 220 may determine whether the pixel is viewable or unviewable as viewed from the viewpoint position ($X_c$, $Y_c$, $Z_c$). In this case, the predictor 220 sends viewability information (region information) 225 for all the pixels to the corrector 230.

Next, the corrector 230 corrects the input image 301 so that the input image 301 is set within the viewable region (step S207). Specifically, the corrector 230 changes the size of the input image 301 so that the input image 301 entirely is set within the viewable region. Then, the corrector 230 moves the position of the pixels.

FIGS. 8 and 9A to 9D are schematic plan views describing a specific example of the correction method of the corrector.

Figure 9A:
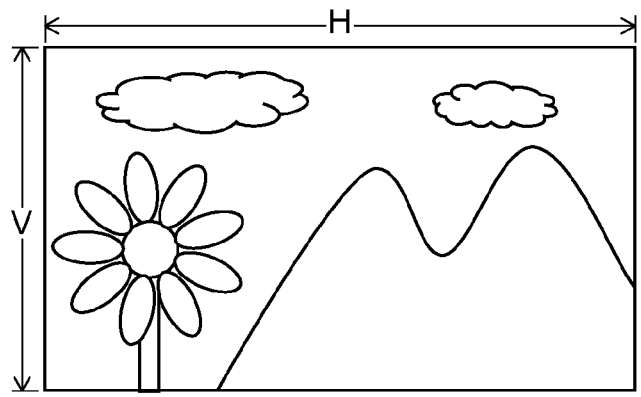
FIGS. 9A to 9D are schematic plan views describing a specific example of the correction method of the corrector.
Figure 9B:
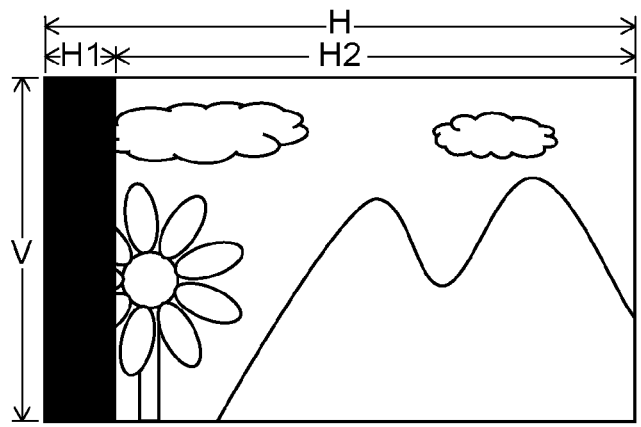
Figure 9C:
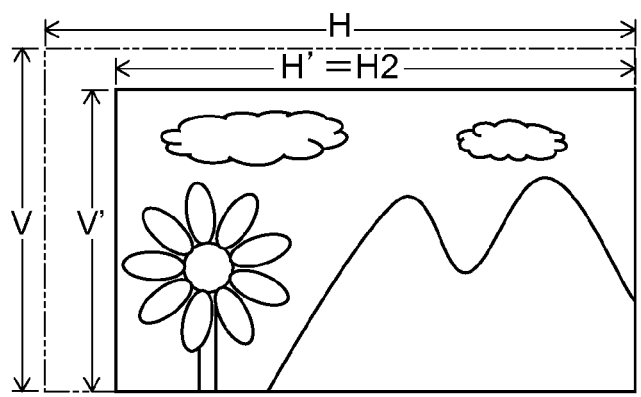
Figure 9D:
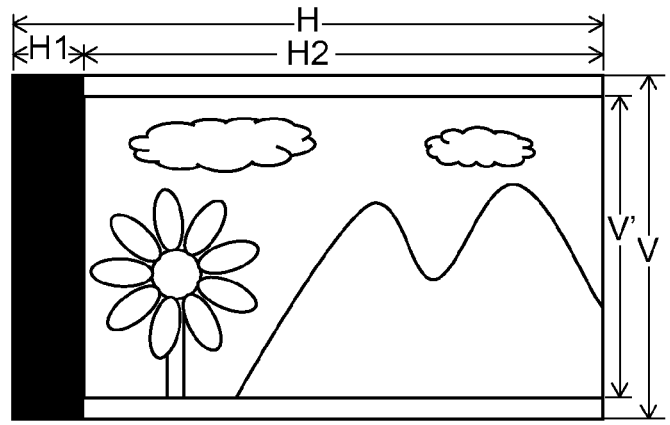

FIG. 9A is a schematic plan view showing an input image. FIG. 9B is a schematic plan view showing a viewable region. FIG. 9C is a schematic plan view showing a reduction image. FIG. 9D is a schematic plan view showing a correction image.

A specific example of the correction method of the corrector is described with reference to FIGS. 8 and 9A to 9D.

Figure 8:
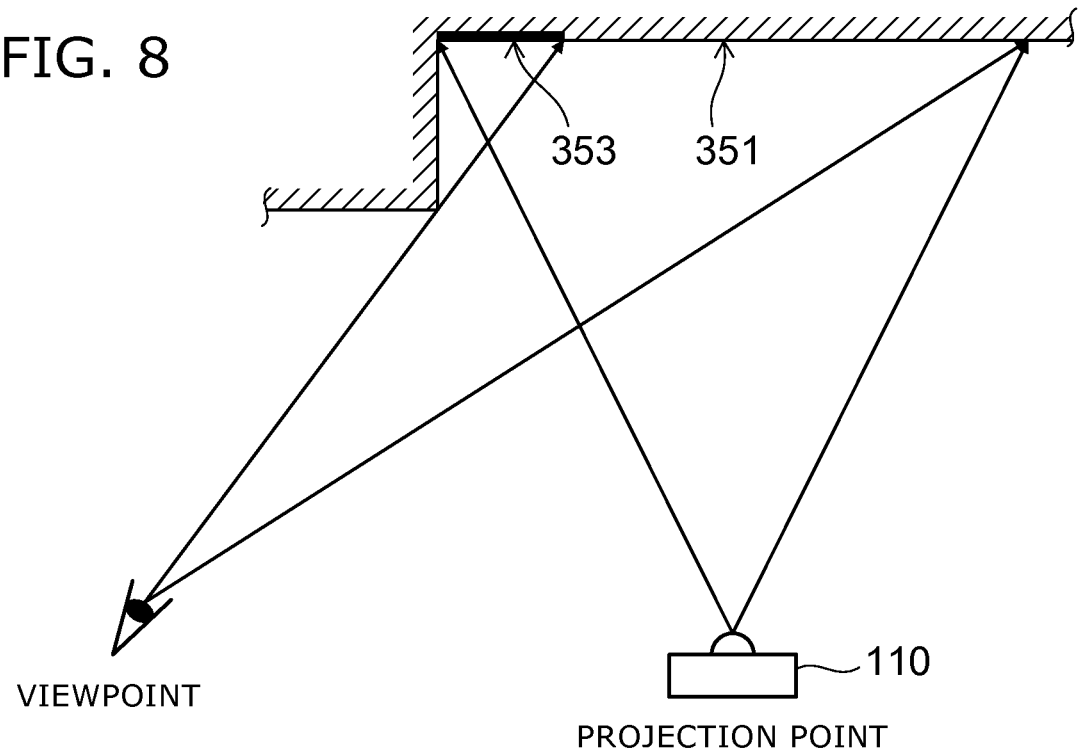
FIG. 8 is a schematic plan view describing a specific example of the correction method of the corrector.

This specific example is described with reference to the case where the positional relation among the projection point, the projection surface 351, and the viewpoint is as shown in FIG. 8.

In this case, FIG. 9B shows an image in which the region unviewable from the viewpoint position is filled with black in the input image 301 based on the viewable region information 225 sent from the predictor 220. As shown in FIGS. 8 and 9B, on the projection surface 351 as viewed from the viewpoint position, H1 pixels from the left end of the input image 301 constitute a blind spot 353. That is, the region of H1 pixels from the left end of the input image 301 cannot be viewed.

Thus, the corrector 230 reduces the size of the input image 301 so that the input image 301 is set within the viewable region. Specifically, the horizontal number of pixels of the input image 301 is denoted by "H". The corrector 230 reduces the size of the input image 301 so that the horizontal number of pixels turns to the number of pixels H' given by Equation (11). Furthermore, the vertical number of pixels of the input image 301 is denoted by "V". The corrector 230 reduces the size of the input image 301 so that the vertical number of pixels turns to the number of pixels V' given by Equation (12).

[Math 7]

$$H' = \frac{H2}{H} \times H = H2 \quad \text{Equation (11)}$$

$$V' = \frac{H2}{H} \times V \quad \text{Equation (12)}$$

The reduction image (third image) obtained by reducing the size of the input image 301 by the corrector 230 is as shown in FIG. 9C. That is, in this specific example, the corrector 230 reduces the size of the input image 301 so that the input image 301 is set within the viewable region while keeping the aspect ratio of the input image 301.

Here, the corrector 230 does not necessarily need to keep the aspect ratio of the input image 301 in reducing the size of the input image 301. For instance, in the example shown in FIGS. 8 and 9B, the corrector 230 may reduce the horizontal size of the input image 301, and does not need to reduce the vertical size of the input image 301. Also in this case, the corrector 230 can reduce the size of the input image 301 so that the input image 301 is set within the viewable region. Alternatively, given pixels from the upper end of the input image 301 may constitute a blind spot 353. In this case, the corrector 230 may reduce the vertical size of the input image 301, and does not need to reduce the horizontal size of the input image 301. Also in this case, the corrector 230 can reduce the size of the input image 301 so that the input image 301 is set within the viewable region. Alternatively, there may be pixels that are not used at normal times (e.g., when there is no blind spot 353). In this case, the corrector 230 can expand the size of the input image 301 using the normally unused pixels so that the input image 301 is set within the viewable region. Also in this case, the corrector 230 can change the size of the input image 301 so that the input image 301 is set within the viewable region.

Next, the corrector 230 moves the size-changed image (the reduction image in this specific example) so as to satisfy the condition of Equations (13) and (14). Specifically, the corrector 230 moves the size-changed image so that the horizontal position of the pixels of the size-changed image is set within the region between the position of H1 pixels from the left end of the input image 301 and the position of H1+H2 pixels from the left end of the input image 301. That is, the corrector 230 moves the size-changed image so that the horizontal position of the pixels of the size-changed image is set within the region of H2 pixels from the H1-th pixel from the left end of the input image 301 (viewable horizontal region). Furthermore, the corrector 230 moves the size-changed image so that the vertical position of the pixels of the size-changed image is set within the region between the position of (V−V')/2 pixels from the lower end of the input image 301 and the position of (V+V')/2 pixels from the lower end of the input image 301. That is, the corrector 230 moves the size-changed image so that the vertical position of the pixels of the size-changed image is located generally at the center position of V pixels. In other words, the corrector 230 performs processing for generating an image in which the pixel shifted from the initial position by the determined amount and direction is assigned with the pixel value assigned to the pixel at the initial position.

[Math 8]

$$H1 \le x < H1 + H2 \quad \text{Equation (13)}$$

$$\frac{(V - V')}{2} \le y < \frac{(V + V')}{2} \quad \text{Equation (14)}$$

FIG. 9D shows a correction image obtained by the image processing method described in this specific example.

The image processor 200a of this specific example performs reduction of the input image 301 and movement of the input image 301 based on the viewable region. Thus, the image processor 200a can display the original image (input image 301) without loss on the viewable region.

The corrector 230 sends the correction image 235 to the projection section 110. The projection section 110 projects the correction image 235 (step S209).

According to this specific example, the input image 301 can be displayed without loss even in the case where there is a blind spot 353 on the projection surface 351 as viewed from an arbitrary viewpoint different from the image projector 100a.

FIGS. 10 and 11A to 11C are schematic plan views describing an alternative specific example of the correction method of the corrector.

Figure 11A:
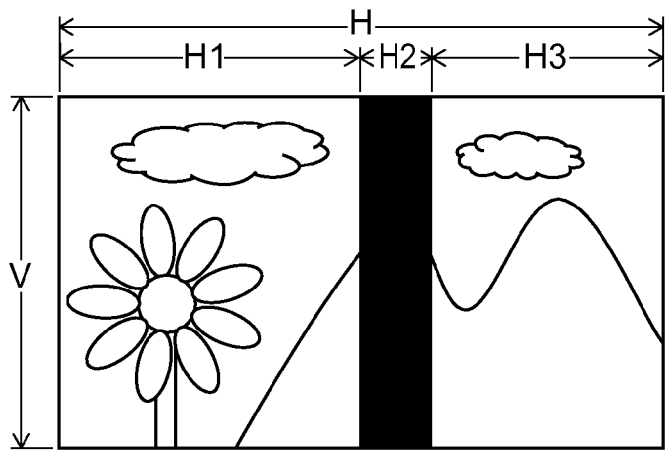
FIGS. 11A to 11C are schematic plan views describing an alternative specific example of the correction method of the corrector.
Figure 11B:
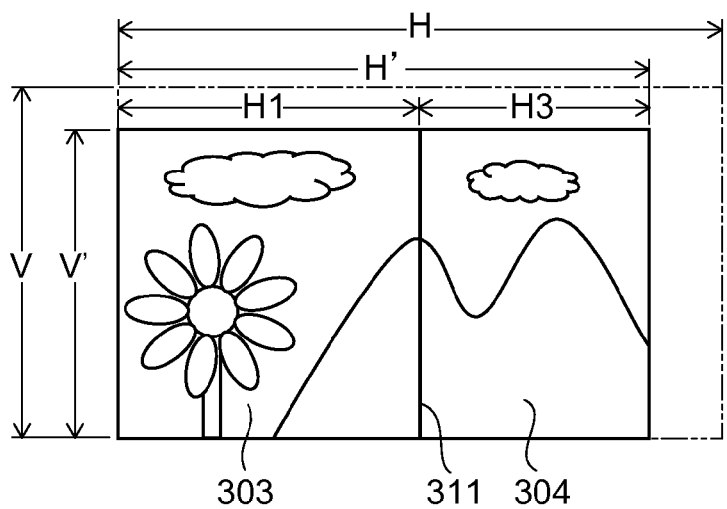
Figure 11C:
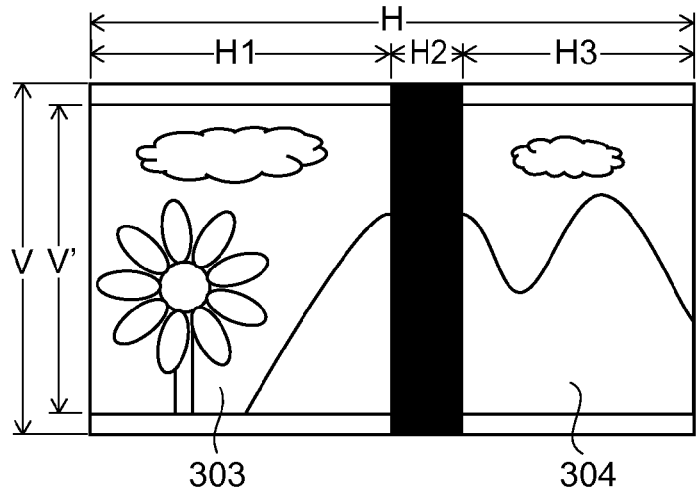

FIG. 11A is a schematic plan view showing a viewable region. FIG. 11B is a schematic plan view showing a reduction image. FIG. 11C is a schematic plan view showing a correction image.

The input image 301 of this specific example is the same as the input image shown in FIG. 9A.

Figure 10:
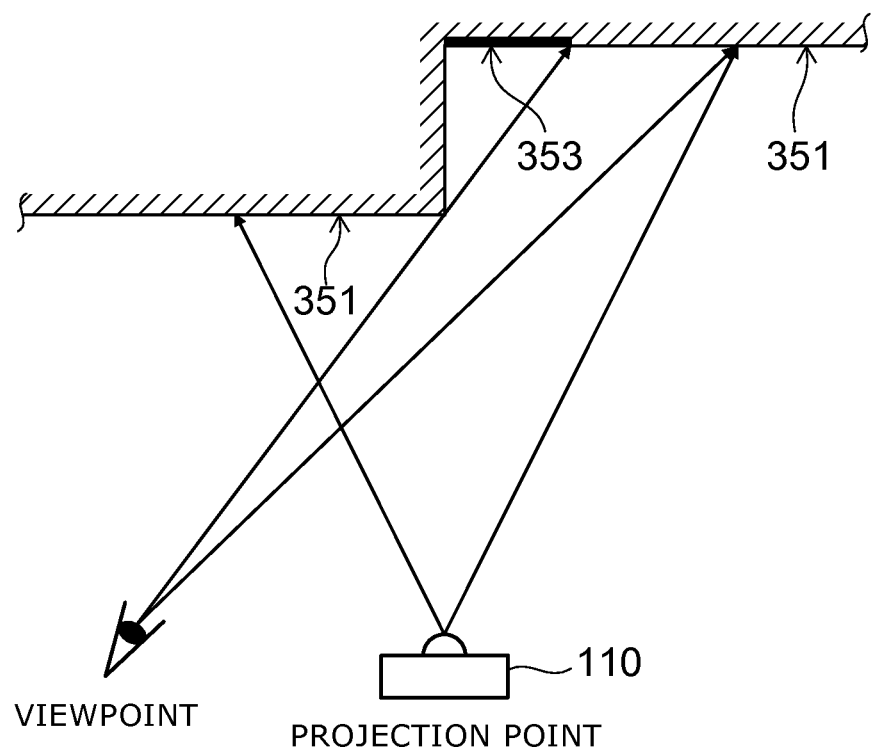
FIG. 10 is a schematic plan views describing an alternative specific example of the correction method of the corrector.

This specific example is described with reference to the case where the positional relation among the projection point, the projection surface 351, and the viewpoint is as shown in FIG. 10.

In this case, FIG. 11A shows an image in which the region unviewable from the viewpoint position is filled with black in the input image 301 based on the viewable region information 225 sent from the predictor 220. As shown in FIGS. 10 and 11A, on the projection surface 351 as viewed from the viewpoint position, the region of H2 pixels from the H1-th pixel from the left end of the input image 301 constitutes a blind spot 353. That is, the region of H2 pixels from the H1-th pixel from the left end of the input image 301 cannot be viewed.

Thus, the corrector 230 reduces the size of the input image 301 so that the input image 301 is set within the viewable region. Specifically, the corrector 230 reduces the size of the input image 301 so that the horizontal number of pixels turns to the number of pixels H' given by Equation (15). Furthermore, the corrector 230 reduces the size of the input image 301 so that the vertical number of pixels turns to the number of pixels V' given by Equation (16).

[Math 9]

$$H' = \frac{H1 + H3}{H} \times H = H1 + H3 \qquad \text{Equation (15)}$$

$$V' = \frac{H1 + H3}{H} \times V \qquad \text{Equation (16)}$$

The reduction image obtained by reducing the size of the input image 301 by the corrector 230 is as shown in FIG. 11B. In this specific example, the corrector 230 reduces the size of the input image 301 so that the input image 301 is set within the viewable region while keeping the aspect ratio of the input image 301. Here, the corrector 230 does not necessarily need to keep the aspect ratio of the input image 301. This is as described above with reference to FIGS. 8 and 9A to 9D.

Next, the corrector 230 divides the reduction image shown in FIG. 11B into two at the H1-th pixel from the left end. The solid line 311 shown in FIG. 11B represents the division position in the reduction image. The corrector 230 moves the left image 303 (image piece) of the divided images (image pieces: plurality of fourth images) so as to satisfy the condition of Equations (17) and (18). The corrector 230 moves the right image 304 (image piece) of the divided images so as to satisfy the condition of Equations (19) and (20).

The corrector 230 performs processing similar to the processing described above with reference to FIG. 9C. Specifically, the corrector 230 moves the left image 303 of the divided images so that the horizontal position of the pixels of the left image 303 of the divided images is set within the region between the left end of the input image 301 and the position of H1 pixels from the left end of the input image 301. That is, the corrector 230 moves the left image 303 of the divided images so that the horizontal position of the pixels of the left image 303 of the divided images is set within the region of H1 pixels from the left end of the input image 301 (viewable horizontal region on the left side of the blind spot 353). Furthermore, the corrector 230 moves the right image 304 of the divided images so that the horizontal position of the pixels of the right image 304 of the divided images is set within the region between the position of H1+H2 pixels from the left end of the input image 301 and the position of H1+H2+H3 pixels from the left end of the input image 301. That is, the corrector 230 moves the right image 304 of the divided images so that the horizontal position of the pixels of the right image 304 of the divided images is set within the region of H3 pixels from the (H1+H2)-th pixel from the left end of the input image 301 (viewable horizontal region on the right side of the blind spot 353). The vertical movement of the pixels of the image is as described above with reference to FIG. 9C.

[Math 10]

$$0 \leq x < H1 \qquad \text{Equation (17)}$$

$$\frac{(V - V')}{2} \leq y < \frac{(V + V')}{2} \qquad \text{Equation (18)}$$

[Math 11]

$$(H1 + H2) \leq x < (H1 + H2 + H3) \qquad \text{Equation (19)}$$

$$\frac{(V - V')}{2} \leq y < \frac{(V + V')}{2} \qquad \text{Equation (20)}$$

FIG. 11C shows a correction image obtained by the image processing method described in this specific example.

The image processor 200a of this specific example performs reduction of the input image 301, division of the input image 301, and movement of the input image 301 based on the viewable region. Thus, the image processor 200a can display the original image (input image 301) without loss on the viewable region.

The corrector 230 sends the correction image 235 to the projection section 110. The projection section 110 projects the correction image 235 (step S209).

According to this specific example, the input image 301 can be displayed without loss even in the case where there is a blind spot 353 on the projection surface 351 as viewed from an arbitrary viewpoint different from the image projector 100a.

Next, an alternative specific example of the image processor and the image processing method is described with reference to the drawings.

Figure 12:
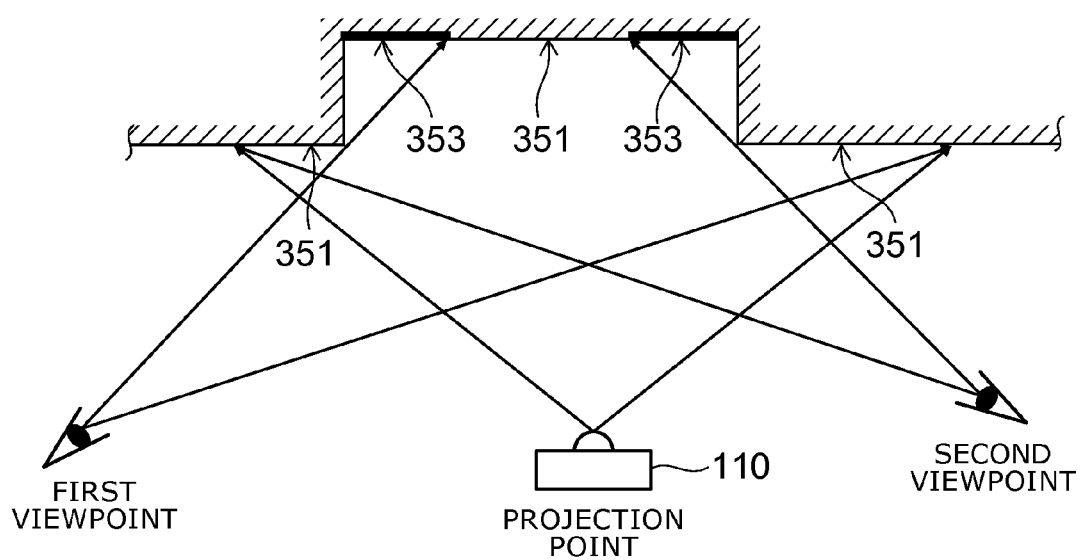
FIG. 12 is a schematic plan view showing the positional relation among the projection point, the projection surface, and the viewpoint.

FIG. 12 is a schematic plan view showing the positional relation among the projection point, the projection surface, and the viewpoint.

Figure 13A:
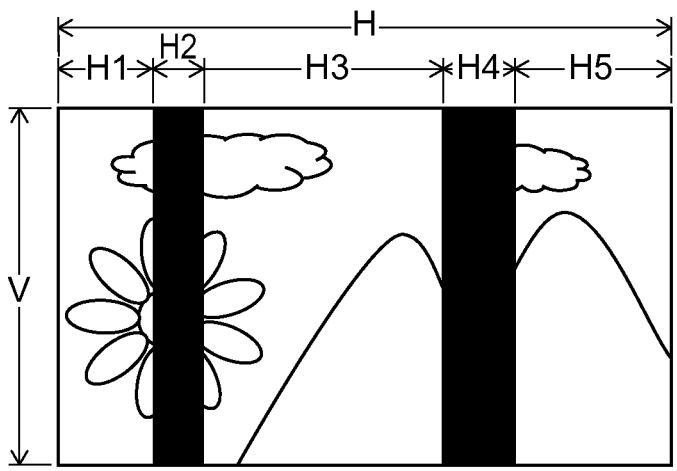
FIGS. 13A to 13C are schematic plan views describing a specific example of the correction method of the corrector.
Figure 13B:
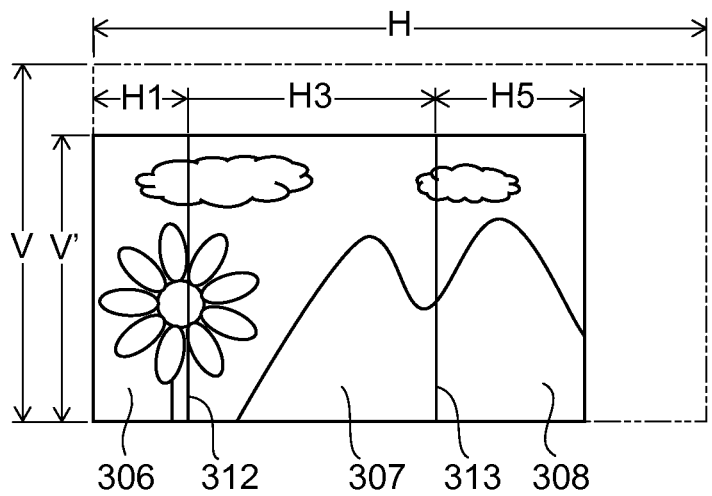
Figure 13C:
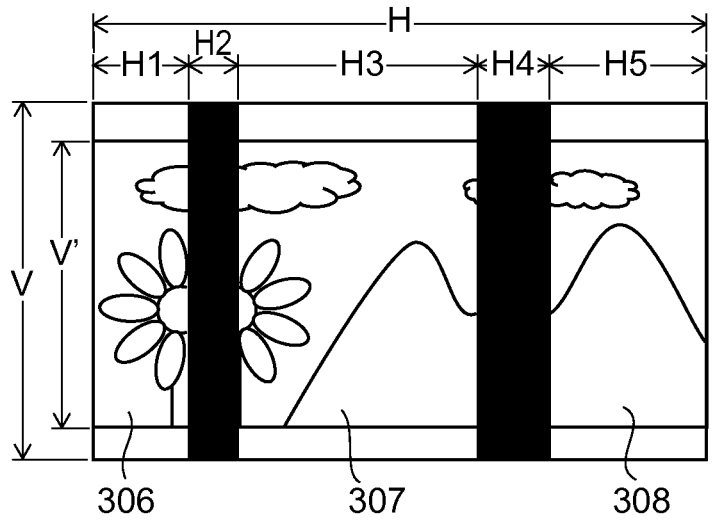

FIGS. 13A to 13C are schematic plan views describing a specific example of the correction method of the corrector.

FIG. 13A is a schematic plan view showing a viewable region. FIG. 13B is a schematic plan view showing a reduction image. FIG. 13C is a schematic plan view showing a correction image.

The input image 301 of this specific example is the same as the input image shown in FIG. 9A.

The main configuration of the image processor 200a of this specific example is the same as the main configuration described above with reference to FIG. 3.

The viewpoint acquisitor 212 of the specific examples described above with reference to FIGS. 3 to 11C acquires one piece of viewpoint information 217. In contrast, the viewpoint acquisitor 212 of this specific example acquires a plurality of pieces of viewpoint information 217. The predictor 220 of this specific example calculates region information 225 of the region simultaneously viewable from a plurality of viewpoints. The corrector 230 of this specific example corrects the input image 301 so as to display the input image 301 in the region simultaneously viewable from the plurality of viewpoints.

The details of the viewpoint acquisitor 212, the predictor 220, and the corrector 230 are described.

Like the viewpoint acquisitor 212 described above with reference to FIGS. 3 and 4, the viewpoint acquisitor 212 of this specific example acquires information regarding the position of a plurality of viewpoints by reading the LUT. Alternatively, a user may input information regarding the position of viewpoints by the input section 250 (see FIG. 3). Thus, the viewpoint acquisitor 212 acquires information regarding the position of a plurality of viewpoints. Alternatively, the viewpoint acquisitor 212 acquires information regarding the position of a plurality of viewpoints based on the distance between the projection section 110 and the projection surface 351.

This specific example is described with reference to an example in which the viewpoint acquisitor 212 acquires information regarding the position of two viewpoints. The viewpoint acquisitor 212 sends the acquired coordinates ($X_{c1}$, $Y_{c1}$, $Z_{c1}$) of the position of the viewpoint and the acquired coordinates ($X_{c2}$, $Y_{c2}$, $Z_{c2}$) of the position of the viewpoint to the predictor 220.

Like the predictor 220 described above with reference to FIGS. 3 and 4, the predictor 220 uses projective texture mapping to calculate an observation image $m_{e1}$ of the projection surface 351 as viewed from the viewpoint position ($X_{c1}$, $Y_{c1}$, $Z_{c1}$) when the image is projected from the projection point. Furthermore, the predictor 220 uses projective texture mapping to calculate an observation image $m_{e2}$ of the projection surface 351 as viewed from the viewpoint position ($X_{c2}$, $Y_{c2}$, $Z_{c2}$) when the image is projected from the projection point.

In this specification, the coordinates ($X_{c1}$, $Y_{c1}$, $Z_{c1}$) of the position of the viewpoint may be referred to as viewpoint position ($X_{c1}$, $Y_{c1}$, $Z_{c1}$). In this specification, the coordinates ($X_{c2}$, $Y_{c2}$, $Z_{c2}$) of the position of the viewpoint may be referred to as viewpoint position ($X_{c2}$, $Y_{c2}$, $Z_{c2}$).

The predictor 220 determines a corresponding region of the texture image $m_o$ and the observation image $m_{e1}$. Thus, the predictor 220 calculates a viewable region of the projection surface 351 as viewed from the viewpoint position ($X_{c1}$, $Y_{c1}$, $Z_{c1}$). Furthermore, the predictor 220 determines a corresponding region of the texture image $m_o$ and the observation image $m_{e2}$. Thus, the predictor 220 calculates a viewable region of the projection surface 351 as viewed from the viewpoint position ($X_{c2}$, $Y_{c2}$, $Z_{c2}$). The predictor 220 defines a viewable region as the region viewable from both the viewpoint position ($X_{c1}$, $Y_{c1}$, $Z_{c1}$) and the viewpoint position ($X_{c2}$, $Y_{c2}$, $Z_{c2}$). The predictor 220 defines an unviewable region as the region viewable from one of the viewpoint position ($X_{c1}$, $Y_{c1}$, $Z_{c1}$) and the viewpoint position ($X_{c2}$, $Y_{c2}$, $Z_{c2}$), but unviewable, i.e., constituting a blind spot, from the other of the viewpoint position ($X_{c1}$, $Y_{c1}$, $Z_{c1}$) and the viewpoint position ($X_{c2}$, $Y_{c2}$, $Z_{c2}$). The predictor 220 sends information (region information) 225 regarding the viewable region to the corrector 230.

The corrector 230 corrects the input image 301 based on the information (region information) 225 regarding the viewable region sent from the predictor 220. The correction method of the corrector 230 of this specific example is described with reference to the drawings.

This specific example is described with reference to the case where the positional relation among the projection point, the projection surface 351, and the viewpoint is as shown in FIG. 12. In this specific example, the predictor 220 calculates a region constituting a blind spot 353 for two viewpoints (first viewpoint and second viewpoint). Thus, as shown in FIG. 12, there are two regions constituting a blind spot 353. FIG. 13A shows an image in which the region unviewable from the viewpoint position is filled with black in the input image 301 based on the information (region information) 225 regarding the viewable region sent from the predictor 220. As shown in FIGS. 12 and 13A, on the projection surface 351 as viewed from the viewpoint position, the region of H2 pixels from the H1-th pixel from the left end of the input image 301 constitutes a blind spot 353. Furthermore, the region of H4 pixels from the (H1+H2+H3)-th pixel from the left end of the input image 301 constitutes a blind spot 353.

Thus, the corrector 230 counts the number of viewable pixels. The corrector 230 reduces the size of the input image 301 so that the input image 301 is set within the viewable region. That is, the corrector 230 reduces the size of the input image 301 so that the horizontal number of pixels is made equal to the number of pixels H' given by Equation (21). Furthermore, the corrector 230 counts the number of viewable pixels. The corrector 230 reduces the size of the input image 301 so that the input image 301 is set within the viewable region. That is, the corrector 230 reduces the size of the input image 301 so that the vertical number of pixels is made equal to the number of pixels V' given by Equation (22).

[Math 12]

$$H' = H \times \frac{H1 + H3 + H5}{H} \qquad \text{Equation (21)}$$

$$V' = V \times \frac{H1 + H3 + H5}{H} \qquad \text{Equation (22)}$$

The reduction image obtained by reducing the size of the input image 301 by the corrector 230 is as shown in FIG. 13B. In this specific example, the corrector 230 reduces the size of the input image 301 so that the input image 301 is set within the viewable region while keeping the aspect ratio of the input image 301. Here, the corrector 230 does not necessarily need to keep the aspect ratio of the input image 301. This is as described above with reference to FIGS. 8 and 9A to 9D.

Next, the corrector 230 divides the reduction image shown in FIG. 13B into three with lengths of H1 pixels, H3 pixels, and H5 pixels from the left end. The solid line 312 shown in FIG. 13B represents the division position between the image of a length of H1 pixels and the image of a length of H3 pixels in the reduction image. The solid line 313 shown in FIG. 13B represents the division position between the image of a length of H3 pixels and the image of a length of H5 pixels in the reduction image. The corrector 230 moves the left image 306 (image piece) of the divided images so as to satisfy the condition of Equation (23). The corrector 230 moves the center image 307 (image piece) of the divided images so as to satisfy the condition of Equation (24). The corrector 230 moves the right image 308 (image piece) of the divided images so as to satisfy the condition of Equation (25).

[Math 13]

$$0 \le x < H1, \quad \frac{(V - V')}{2} \le y < \frac{(V + V')}{2} \qquad \text{Equation (23)}$$

$$(H1 + H2) \le x < (H1 + H2 + H3), \qquad \text{Equation (24)}$$
$$\frac{(V - V')}{2} \le y < \frac{(V + V')}{2}$$

$$(H1 + H2 + H3 + H4) \le x < (H1 + H2 + H3 + H4 + H5), \qquad \text{Equation (25)}$$
$$\frac{(V - V')}{2} \le y < \frac{(V + V')}{2}$$

FIG. 13C shows a correction image obtained by the image processing method described in this specific example. As shown in FIG. 13C, the image processor 200a of this specific example can display the input image 301 without loss on the viewable region.

Here, the viewpoint acquisitor 212 may define two viewpoints (first viewpoint and second viewpoint) as two points across the projection point. Then, between the first viewpoint and the second viewpoint, the input image 301 can be observed without loss from any position.

According to this specific example, the input image 301 can be displayed without loss even in the case where there is a blind spot 353 on the projection surface 351 as viewed from a plurality of arbitrary viewpoints different from the image projector 100a.

Next, a further alternative specific example of the image processor and the image processing method is described.

The main configuration of the image processor 200a of this specific example is the same as the main configuration described above with reference to FIG. 3.

In this specific example, the calculator 211 determines a region incapable of calculation of the three-dimensional shape of the projection surface 351. The predictor 220 predicts that the region incapable of calculation of the three-dimensional shape is a region unviewable from the viewpoint.

The details of the calculator 211 and the predictor 220 are described.

The calculator 211 calculates shape information 215 using the distance measured by the distance sensor 240 (the distance from the distance sensor 240 to the projection surface 351). The shape information 215 is information regarding the three-dimensional shape of the projection surface 351. Here, depending on the material of the projection surface 351, the calculator 211 may fail to calculate the three-dimensional shape of the projection surface 351. For instance, at least part of the projection surface 351 may include a material exhibiting specular reflection. In this case, the light projected from the light projection part 241 of the distance sensor 240 is reflected with a reflection angle equal to the incidence angle for the specular material. Thus, the reflection light does not reach the light reception part 242 of the distance sensor 240. Accordingly, the distance sensor 240 cannot measure the distance between the distance sensor 240 and the portion including the specular material.

This is not limited to the case where the material exhibits specular reflection. The material may scarcely reflect the light projected from the light projection part 241, and the light reception part 242 cannot receive the light. Alternatively, the material may reflect a small amount of the light projected from the light projection part 241, and the amount of light received by the light reception part 242 may be insufficient. In these cases, the distance sensor 240 cannot measure the distance for that portion of the material. The image projected on the unmeasurable region cannot be observed from an arbitrary position. The unmeasurable region is a region in which the distance sensor 240 cannot calculate the distance on the projection surface 351. Thus, viewability is compromised due to the influence of the unmeasurable region when the entirety of the projection surface 351 is viewed from an arbitrary viewpoint. Accordingly, in the case where there is an unmeasurable region, the calculator 211 of this specific example does not specify the three-dimensional coordinates of the unmeasurable region. The calculator 211 specifies the shape of the projection surface 351 assuming that there is no surface in the unmeasurable region. The calculator 211 calculates the shape information 215 and projection point information 216. The shape information 215 is information regarding the three-dimensional shape of the projection surface 351. The projection point information 216 is information regarding the position of the projection point. The calculator 211 sends the shape information 215 and the projection point information 216 to the predictor 220.

The predictor 220 predicts viewable region information 225 based on the shape information 215 of the projection surface, the projection point information 216, and the viewpoint information 217. The predictor 220 uses projective texture mapping to calculate an observation image $m_e$ of the image projected from the projection point on the projection surface 351 as viewed from the viewpoint position ($X_c$, $Y_c$, $Z_c$). Here, the shape information 215 of the projection surface 351 does not include the shape information of the unmeasurable region. Thus, as a result of projective texture mapping, the region projected from the projection section 110 on the unmeasurable region does not exist in the observation image $m_e$. Accordingly, the predictor 220 predicts that the region projected on the unmeasurable region is unviewable. The predictor 220 sends the viewable region information 225 to the corrector 230.

The corrector 230 corrects the input image 301 based on the viewable region information 225. Thus, the input image 301 is not displayed on the unmeasurable region. Accordingly, the image projector 100a of this specific example can display the input image 301 without compromising viewability.

According to this specific example, the predictor 220 determines that the projection surface 351 is unviewable when the light projected from the projection section 110 does not reach the viewpoint even in the case where there is no physical barrier (e.g., obstacle) between the viewpoint and the projection surface 351. The corrector 230 corrects the input image so that the input image 301 is displayed on the viewable region. Thus, the image projector 100a of this specific example can display the input image 301 without compromising viewability.

Next, a further alternative specific example of the image processor and the image processing method is described with reference to the drawings.

Figure 14:
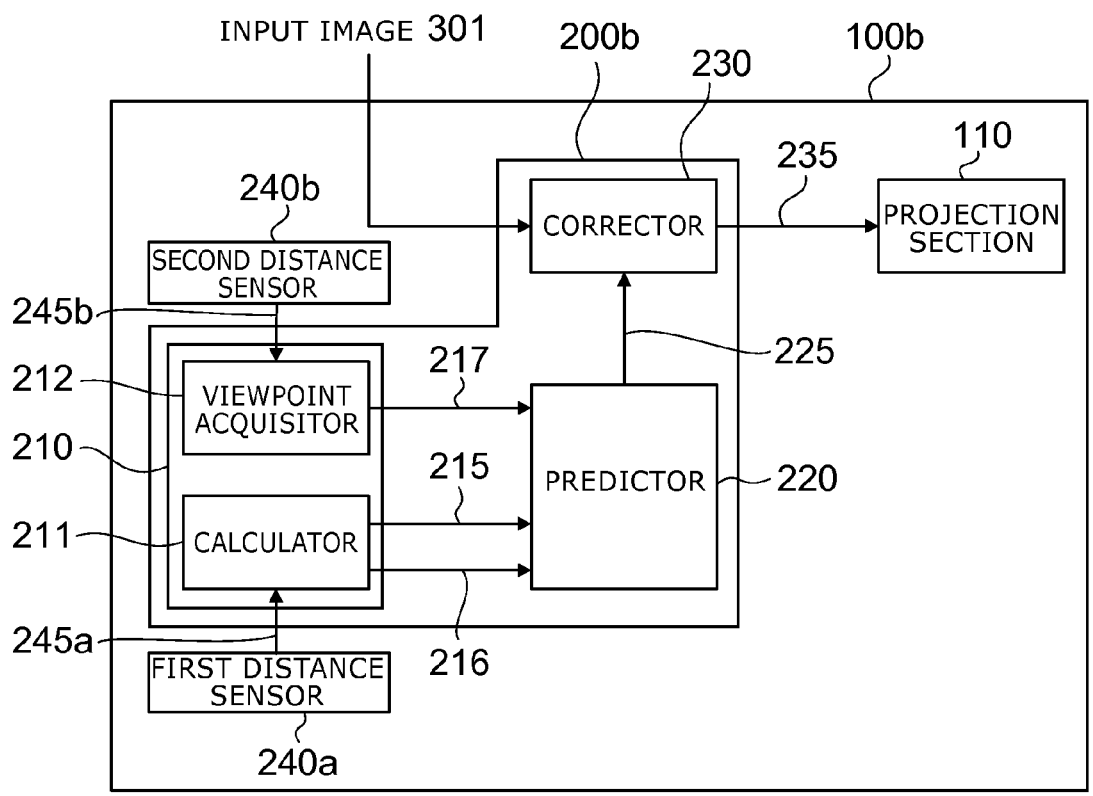
FIG. 14 is a block diagram showing an alternative specific example of the image processor and the image projector according to this embodiment.

FIG. 14 is a block diagram showing an alternative specific example of the image processor and the image projector according to this embodiment.

The image projector 100b shown in FIG. 14 includes an image processor 200b, a projection section 110, a first distance sensor 240a, and a second distance sensor 240b.

The image processor 200b includes an acquisitor 210, a predictor 220, and a corrector 230. The acquisitor 210 includes a calculator 211 and a viewpoint acquisitor 212.

The first distance sensor 240a has the same function as the distance sensor 240 described above with reference to FIG. 3. The first distance sensor 240a sends the acquired first distance information 245a to the calculator 211.

The second distance sensor 240b detects the position of a viewer. The second distance sensor 240b measures the distance from the second distance sensor 240b to the viewpoint of the viewer. The second distance sensor 240b sends information regarding the measured distance (second distance information 245b) to the viewpoint acquisitor 212.

The details of the viewpoint acquisitor 212 are described.

The viewpoint acquisitor 212 calculates the position of the viewpoint using the distance measured by the second distance sensor 240b. The second distance sensor 240b may include a plurality of sensors. The second distance sensor 240b sends the acquired second distance information 245b to the viewpoint acquisitor 212. The viewpoint acquisitor 212 detects the position of a person based on the light projection direction of the second distance sensor 240b and the measured second distance information 245b. The viewpoint acquisitor 212 sends the position of the person as viewpoint information 217 to the predictor 220.

Here, the viewpoint acquisitor 212 may send all the positions of the detected persons as viewpoint information 217 to the predictor 220. Alternatively, in view of the number of detected persons, the viewpoint acquisitor 212 may preferentially send the position of the viewpoint of more persons as viewpoint information 217 to the predictor 220. Alternatively, in view of the state of motion of the person (e.g., the rate of change of the measured distance), the viewpoint acquisitor 212 may preferentially send the position of the viewpoint of a person at rest as viewpoint information 217 to the predictor 220. Alternatively, in view of the line of sight of the viewer, the viewpoint acquisitor 212 may preferentially send the position of the person with the line of sight directed to the projection surface 351 as viewpoint information 217 to the predictor 220.

The predictor 220 predicts information (region information) 225 regarding the viewable region based on the viewpoint information 217, the shape information 215, and the projection point information 216. The predictor 220 sends the region information 225 to the corrector 230. The corrector 230 corrects the input image 301 based on the information (region information) 225 regarding the viewable region. The projection section 110 projects the correction image 235.

Here, the predictor 220 does not necessarily need to predict information regarding a region viewable from all the viewpoints. The predictor 220 may specify a weight depending on the priority for each viewpoint. In this case, for instance, the input image 301 can be displayed on the region with the highest rating in viewability.

According to this specific example, the position of the viewer can be dynamically obtained, and the image can be corrected in accordance with the position of the viewpoint. Thus, the input image 301 can be displayed without loss.

This embodiment has been described with reference to the example in which the region unviewable from the viewpoint position extends vertically. However, the region unviewable from the viewpoint position may extend horizontally. In this case, the corrector 230 corrects the size of the input image 301, and vertically divides the size-changed image at a prescribed position. That is, the corrector 230 divides the size-changed image into an upper image and a lower image. Alternatively, the region unviewable from the viewpoint position may extend obliquely.

The corrector 230 may dynamically correct the input image 301 in response to the motion of a person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processor comprising:
    an acquisitor that acquires information regarding shape of a projection surface on which a first image is projected, information regarding position of a viewpoint for observing the first image projected on the projection surface, and information regarding position of a projection point for projecting the first image;
    a predictor that predicts a viewable region in which the first image projected on the projection surface is viewable from the viewpoint based on the acquired information regarding the shape, the acquired information regarding the viewpoint, and the acquired information regarding the projection point; and
    a corrector that corrects a second image to generate the first image, the second image being set within the viewable region.

2. The processor according to claim 1, wherein the corrector changes size of the second image by changing at least one of horizontal and vertical number of pixels of the second image.

3. The processor according to claim 2, wherein the corrector moves the pixels of a third image into the viewable region, the third image being generated by changing size of the second image.

4. The processor according to claim 2, wherein the corrector divides a third image into a plurality of fourth images and moves at least one of the plurality of fourth images into the viewable region, the third image being generated by changing size of the second image.

5. The processor according to claim 1, wherein
    the acquisitor acquires information regarding positions of a plurality of viewpoints for viewing the first image projected on the projection surface, and
    the predictor predicts a region viewable from all the plurality of viewpoints.

6. An image processing method comprising:
    acquiring information regarding shape of a projection surface on which a first image is projected, information regarding position of a viewpoint for observing the first image projected on the projection surface, and information regarding position of a projection point for projecting the first image;
    predicting a viewable region in which the first image projected on the projection surface is viewable from the viewpoint based on the acquired information regarding the shape, the acquired information regarding the viewpoint, and the acquired information regarding the projection point; and
    correcting a second image to generate the first image, the second image being set within the viewable region.

7. The method according to claim 6, wherein the correction of changing size of the second image is performed by changing at least one of horizontal and vertical number of pixels of the second image.

8. The method according to claim 7, wherein the pixels of a third image is moved into the viewable region, the third image being generated by changing size of the second image.

9. The method according to claim 7, wherein the third image is divided into a plurality of fourth images, and at least one of the plurality of fourth images is moved into the viewable region, the third image being generated by changing size of the second image.

10. The method according to claim 6, wherein
    information regarding positions of a plurality of viewpoints for viewing the first image projected on the projection surface is acquired, and
    a region viewable from all the plurality of viewpoints is predicted.

11. An image projector comprising:
    a first distance sensor that measures a first distance between the first distance sensor and a projection surface on which a first image is projected;
    an acquisitor that acquires information regarding shape of the projection surface and information regarding position of a projection point for projecting the first image based on the first distance measured by the first distance sensor, and acquires information regarding position of a viewpoint for observing the first image projected on the projection surface;

a predictor that predicts a viewable region in which the first image projected on the projection surface is viewable from the viewpoint based on the acquired information regarding the shape, the acquired information regarding the viewpoint, and the acquired information regarding the projection point;

a corrector that corrects a second image to generate the first image, the second image being set within the viewable region; and a projection section that projects the first image on the projection surface.

12. The projector according to claim 11, further comprising:

a second distance sensor that measures a second distance between the second distance sensor and the position of the viewpoint, wherein the acquisitor acquires the information regarding the position of the viewpoint based on the second distance measured by the second distance sensor.

13. The projector according to claim 12, wherein the corrector changes size of the second image by changing at least one of horizontal and vertical number of pixels of the second image.

14. The projector according to claim 13, wherein the corrector moves the pixels of a third image into the viewable region, the third image being generated by changing size of the second image.

15. The projector according to claim 12, wherein the corrector divides a third image into a plurality of fourth images and moves at least one of the plurality of fourth images into the viewable region, the third image being generated by changing size of the second image.

16. The projector according to claim 11, wherein the acquisitor acquires information regarding positions of a plurality of viewpoints for viewing the first image projected on the projection surface, and the predictor predicts a region viewable from all the plurality of viewpoints.

17. The projector according to claim 11, wherein the acquisitor acquires the information regarding the position of the viewpoint by reading a look-up table recording positions of prescribed viewpoints.

18. The projector according to claim 11, wherein the acquisitor calculates distance between the projection section and the projection surface based on the distance measured by the first distance sensor, and acquires the information regarding the position of the viewpoint based on the distance between the projection section and the projection surface and a prespecified angle.

19. The projector according to claim 11, further comprising:

an input section capable of receiving input of position of a viewpoint, wherein the acquisitor acquires the information regarding the position of the viewpoint based on information sent by the input section.

* * * * *